United States Patent [19]

Guichard et al.

[11] Patent Number: 4,887,158
[45] Date of Patent: Dec. 12, 1989

[54] SOUND AND IMAGE TRANSMISSION SYSTEM

[76] Inventors: Jacques Guichard, 8 rue des Morillons, 75015 Paris; Gerard Eude, 26 Allée Jean Bart, 77200 Torcy, both of France

[21] Appl. No.: 256,612

[22] Filed: Oct. 12, 1988

[30] Foreign Application Priority Data

Oct. 12, 1987 [FR] France .................................. 87 14043

[51] Int. Cl.⁴ ....................................... H04N 7/04
[52] U.S. Cl. ...................................... 358/143; 358/85
[58] Field of Search ............... 358/142, 143, 144, 146, 358/86, 85; 379/53

[56] References Cited

U.S. PATENT DOCUMENTS 3,073,896  1/1963  James et al. ........................ 358/134
4,542,406  9/1985  Shimoyama et al. ............... 358/143
4,544,950  10/1985  Tu ....................................... 358/143

FOREIGN PATENT DOCUMENTS 2453441  5/1976  Fed. Rep. of Germany .
2835366  2/1980  Fed. Rep. of Germany .
2023244  8/1970  France .
2345872  10/1977  France .

OTHER PUBLICATIONS

Philips Technical Review, vol. 36, No. 8, 1987.
Electrical Communication, vol. 51, No. 2, 1976.
IEEE Global Telecommunications Conference (Dec. 1986).
Philips Technical Review, vol. 36, No. 4, 1976.
Proceedings of National Communications Forum, vol. 39, 1985.
Technische Rundschau, vol. 78, No. 51, Dec., 1986.
Patent Abstracts of Japan, vol. 8, No. 206, Sep. 1984.
TN-Nachrichten, No. 89, 1986.
British Telecommunication Engineering; "Audiovisual Telecommunication Services-A Unified Approach" by N. D. Kenyon; vol. 4, Oct. 1985, pp. 169–174.

Primary Examiner—John W. Shepperd
Assistant Examiner—Michael D. Parker
Attorney, Agent, or Firm—Nutter, McClennen & Fish

[57] ABSTRACT

A sound and image transmission system which is applicable to television-telephony, uses a single transmission line and multiplexes the image signal and the sound signal with an output which is essentially identical to the rhythm of an encoded image and the sound of the latter image. The encoder and decoder for the image processing lines function for only part of the time, but faster than if they functioned continuously.

6 Claims, 5 Drawing Sheets

SOUND AND IMAGE TRANSMISSION SYSTEM

The purpose of this invention is a system for the transmission of sound and images. It has general applications in the transmission of images and especially in television-telephony, for example, at 64 kbits/s.

The progress made in recent years in the field of electronic components and signal processing equipment has lead to increasingly sophisticated information reduction technology (likewise in the coding of images). This progress makes it possible to foresee the possibility in the near future of implementing television-telephony service with an output as low as 64 kbits/s.

This technology, which brings into play various transformations (Hadmard, Haar, cosine, sine, etc.) is described in the article by J. Guichard and D. Masse entitled "The digital image and coding" published in The Journal "L'echo des Recherches" [The Echo of Research], number 126, 4th quarter 1986, pp. 21–36.

Descriptions of these technologies can also be found in the French patent applications numbers 85 15 649, 86 07 713, and 86 05 213.

FIGS. 1 through 5 illustrate the structure and the operation of systems using the previous state of the art.

FIG. 1 shows an image processing and transmission system. This system includes:

a transmission unit made up of a device (10) for capturing images, a pre-buffer memory (12), which is written upon with a picture signal at a certain frequency (F), read at a frequency (F/N), (N) being an image speed reduction factor and emits a signal corresponding to one picture among (N) pictures, an image coding device (14) which includes an encoder (16) and a buffer memory (18), and this device emits an encoded digital picture signal, a transmission line (20), a receiving unit made up of a decoding device or picture processing unit (22), which receives the encoded digital signal transmitted and includes a decoder (24) and a buffer memory (26), and emits a decoded picture signal at a frequency (F/N), a device (28) for retransmitting the decoded picture signal N times, and a picture display medium (30) which reconstructs the sequences of N identical images.

FIG. 2 illustrates a sound processing system. This system includes:

a sound transmission unit made up of a sound input device (32), an analog-digital converter or sound processing unit (34), which emits a digital sound signal, a transmission line (36), a sound receiving unit made up of a digital-analog converter or sound decoder (38) and a device for restitution of the sound (40).

The devices (10,12,14) in the picture unit and (32,34) in the sound unit constitute which is called a transmission system. The devices (22,28, 30) for the picture unit and devices (38,40) for the sound unit constitute what is called a receiving system.

These two systems function in a parallel manner and constitute two independent channels, which may each have, for example, an output of 64 kbits/s. FIG. 3 also shows a picture channel (Ci) and a sound channel (Cs), identical and parallel.

The operation of the devices shown in FIGS. 1 and 2 is illustrated in FIG. 4. This figure includes six time diagrams.

In the (a) portion of the diagram can be seen a picture scanning signal in the shape of saw teeth. This signal is used in the device (10): Part A corresponds to the scanning by picture spots and part B to the return of the spot. The first scan element shown corresponds to an image marked Io. In the example shown, the fifth image marked I1, then the tenth marked I2, etc. are of interest.

Diagram (b) represents the scanning of the image at the pre-buffer memory (12) output. This memory was written by the Io picture signal during a period of time corresponding to frequency (F) and was read N times more slowly. In the example shown (N=5). Obviously, only one image is retained on N (therefore here, one image in 5). The image which has been "slowed"in this manner, marked I'o, is assumed to be divided into three parts of equal length, marked 1, 2, and 3.

Diagram (c) shows schematically the average number of bits necessary in order to encode image Io. It can be observed that, in the example shown, the number of bits to encode the central portion (2) is greater than the number necessary in order to encode the outside portions (1 and 3), which is generally the case with television-telephony images since the central zone (2) corresponds to the position of the head of the party speaking.

Diagram (d) shows the bits at the output of the memory (18) for the coding device (14). On average, the digital signals for Diagrams (c) and (d) are staggered at an interval equal to the length of a slowed image (I'o).

After the bits of the encoded image have been transmitted, the image is then decoded, which is shown at Io in Diagram (e), where zones 1, 2 and 3 are again found in the reconstructed slowed image.

Diagram (f) shows the restoration of the image Io, to its normal rhythm. Before the end of the signal shown in Diagram (e), the Io image can begin to be reconstructed. At the end of the signal I"o, the first image, I'''o was reconstructed. This image may then be retransmitted N times. In the example shown, the image I'''o is retransmitted five times.

The quantity of bits produced in order to transmit each image depends greatly on the movement of the image. However, the adjustment mechanisms are such that the preceding explanation remains valid in general. FIG. 5 also shows a sequence of three images (part (a)) where the image, Io, has 3 zones (1, 2, 3), as in the example shown in FIG. 4, the image I1 has 3 zones with an equal quantity of bits, and the image I2 has a central zone (2) with a high quantity of bits. The diagrams for parts (b), (c), and (d) show the position of the bits which correspond to the various zones (1, 2, and 3) of these three different images in the buffer memory.

If Diagram (f) of FIG. 4 is compared with Diagram (a) in the same figure, it can be seen that the reconstructed I'''o image is delayed by approximately two coded images with respect to the primitive Io image. For example, if the scanning of the captured image is done at 50 Hz, the Io image has a length of 20 ms; the slowed I'o image and the primitive image will therefore be approximately $2 \times 100 = 200$ ms (exactly 180 ms in the example shown).

If this is not significant when transmitting images alone, it is, in contrast awkward and troublesome in television-telephony where the picture transmission is accompanied by sound. Referring for a moment to FIG. 3, it can be noted that a movement of the speaker's lip will produce a sound (As) which is processed and transmitted without much delay, but that the image (Ai) of the speaker's face will be reconstructed with a delay (R). This staggering of sound and picture is very annoying. It is the reason that it is necessary to delay the sound in order to restore the simultaneity of the visual and sound events. But the interactive character of television-telephony limits the usefulness of this strategy, since the delay it introduces will cause the loss of any spontaneity in the dialogue between two speakers.

The precise purpose of this invention is to solve this problem. For this purpose, it recommends the joint placement of the picture and sound channels: instead of transmitting picture and sound in parallel, for example, on two 64 kbits/s lines, it is more advantageous to transmit them sequentially at double the output, for example, 128 kbits/s for the picture, but using a period of time which is half as long, and 128 kbits for the sound during other half of the time. A coded image is transmitted, then the sound for the image.

This procedure has two advantages:

provided that the image encoder operates twice as fast, then remains inactive during the second half of the time period, the delay due to buffer memories will be cut in half, even with buffer memories of the same size, the sound, which, for lip synchronization reasons, must be delayed when using standard technology, will be automatically delayed when this invention is implemented.

Put more concisely, the purpose of this invention is an image and sound transmission system of the type described above, characterized by the fact that:

(a)—in its transmission system:

(a) The pre-buffer memory, the encoder, and the buffer memory of the image processing unit operate only during a fraction (Ti/T) of the (total operating) time and T/Ti times faster than if they operated continuously, T being the length of the coded image, with the unit emitting a digital signal with an output of Di kbits/s and a length of Ti, (b) The sound processing unit emits a digital sound signal during only a fraction (Ts/T) of the (total operating) time, with an output of Ts kbits/s.

(c) There is in addition, a multiplexer with two inputs, one connected to the output of the coding device of the image processing unit and the other to the output of the sound processing unit. This multiplexer has an output which emits a signal made up of sequences with the time interval (T), each sequence having first a picture signal with a length of Ti, then a sound signal with a length of Ts, with T=Ti+Ts, (B)—The transmission unit is made up of a single transmission line connected to the multiplexer output. This single line has an output (D) equal to the sum of the outputs (Di and Ds), (C)—in its receiving unit:

(a) The design calls for a demultiplexer with an input connected to a single transmission line and to two outputs, the first of which emits a digital picture image with a length of Ti and an output of Di, and the second of which emits a digital sound signal with a length of Ts and an output of Ds, (b) The picture processing unit is connected to the first demultiplexer output and to its decoder, which only operates during a fraction (Ti/T) of the (total operating) time, with Ts being the length of the picture signal.

(c) The sound processing unit is connected to the second demultiplexer output and to its decoder, which only operates during a fraction (Ti/T) of the (total operating) time, with Ts being the length of the sound signal.

In any case, the invention's characteristics are better presented in the following description of examples of implementation methods which are given solely for purposes of explanation and which are not at all restrictive. This description refers to the attached drawings, of which:

DESCRIPTION OF THE PREFERRED EMBODIMENTS

Figure 1:
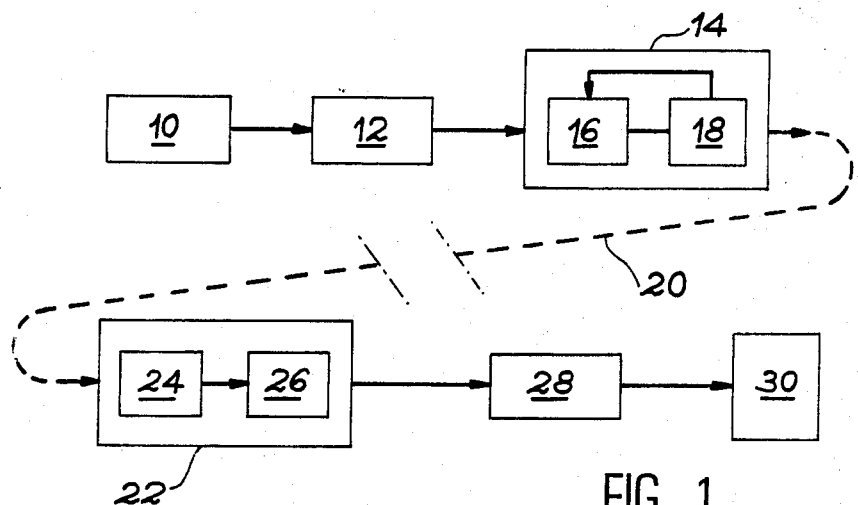
FIG. 1, described above, shows a picture transmission system using the previous state of the art, FIG. 2, described above, shows a sound transmission system using the previous state of the art, FIG. 3, described above, shows two picture and sound channels, FIG. 4, described above, shows time diagrams which explain the operation of the systems in FIGS. 1 and 2, FIG. 5, described above, shows the arrangement of a buffer memory with respect to processed images.
Figure 2:
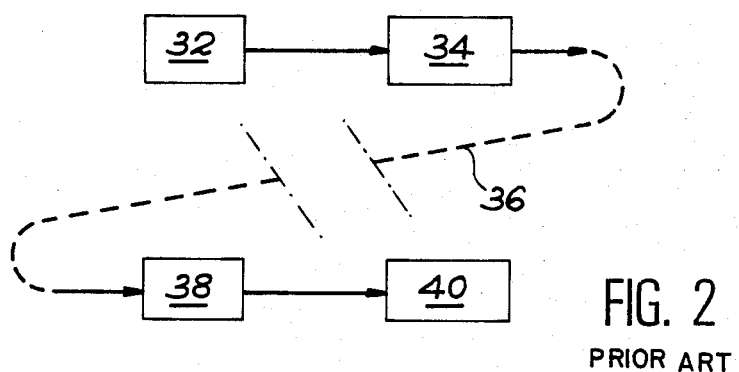
Figure 3:
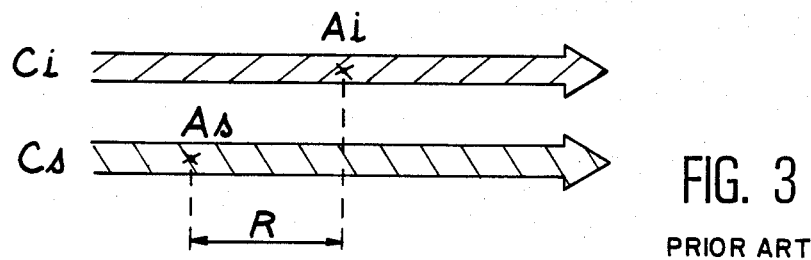
Figure 6:
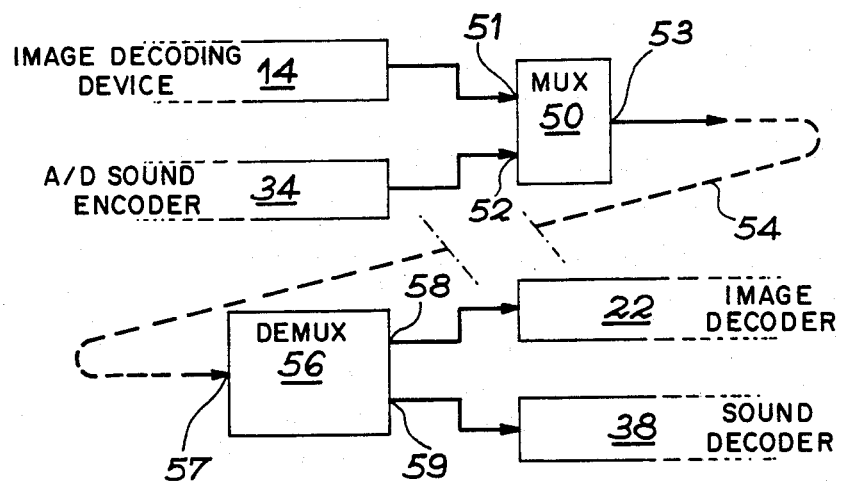
FIG. 6 shows the overall operating design of the invention system.

The system depicted in FIG. 6 includes the devices already shown in FIGS. 1 and 2, in particular a transmission system symbolically represented by the image encoder (14) and the analog-digital sound encoder (34).

But, in contrast with the previous state of the art, the image encoder operates only during a fraction (Ti/T) of the (total operating) time (for example, half of the time) and T/Ti times faster (for example, two times faster) that if it operated continuously. This encoder, therefore, emits a digital signal with an output of Di kbits/s and with a length of Ti, the length T, being the length of an encoded image.

Likewise, the sound encoder (34) emits a digital sound signal only during a fraction (Ts/T) of the (total operating) time (for example, half of the time) with an output of Ds kbits/s, which is T/Ts times greater than normal.

The system shown in FIG. 6 includes as well a multiplexer (50) with two inputs (51,52), one of which (51) is connected to the output of the encoding device (14) in the image processing unit, and the other (52) to the output of the sound encoder. This multiplexer (50) has an output (53) which emits a signal made up of sequences with a time interval (T), and each sequence includes, first, a picture signal with a length of Ti, then a sound signal with a length of Ts, with T=Ti+Ts.

In the invention, the device for the transmission of picture and sound signals has a single transmission line (54) connected to the multiplexer (50) output (53). This single line has an output (D) equal to the sum of outputs (Di and Ds).

In the invention system, the design also calls for a demultiplexer (56) with one input (57) connected to the single transmission line (54) and with two outputs (58,59), placed before the receiving system represented schematically by the image decoder (22) and the sound decoder (38). The first of these outputs (58) emits a digital picture signal with a length of Ti and an output of Di, and the second (59) emits a digital sound signal with a length of Ts and an output of Ds.

The picture decoding device unit (22) is connected to the first output (58) of the demultiplexer and to its decoder (24), which only operates during a fraction (Ti/T) of the (total operating) time, with Ti being the length of the picture signal.

Figure 7:
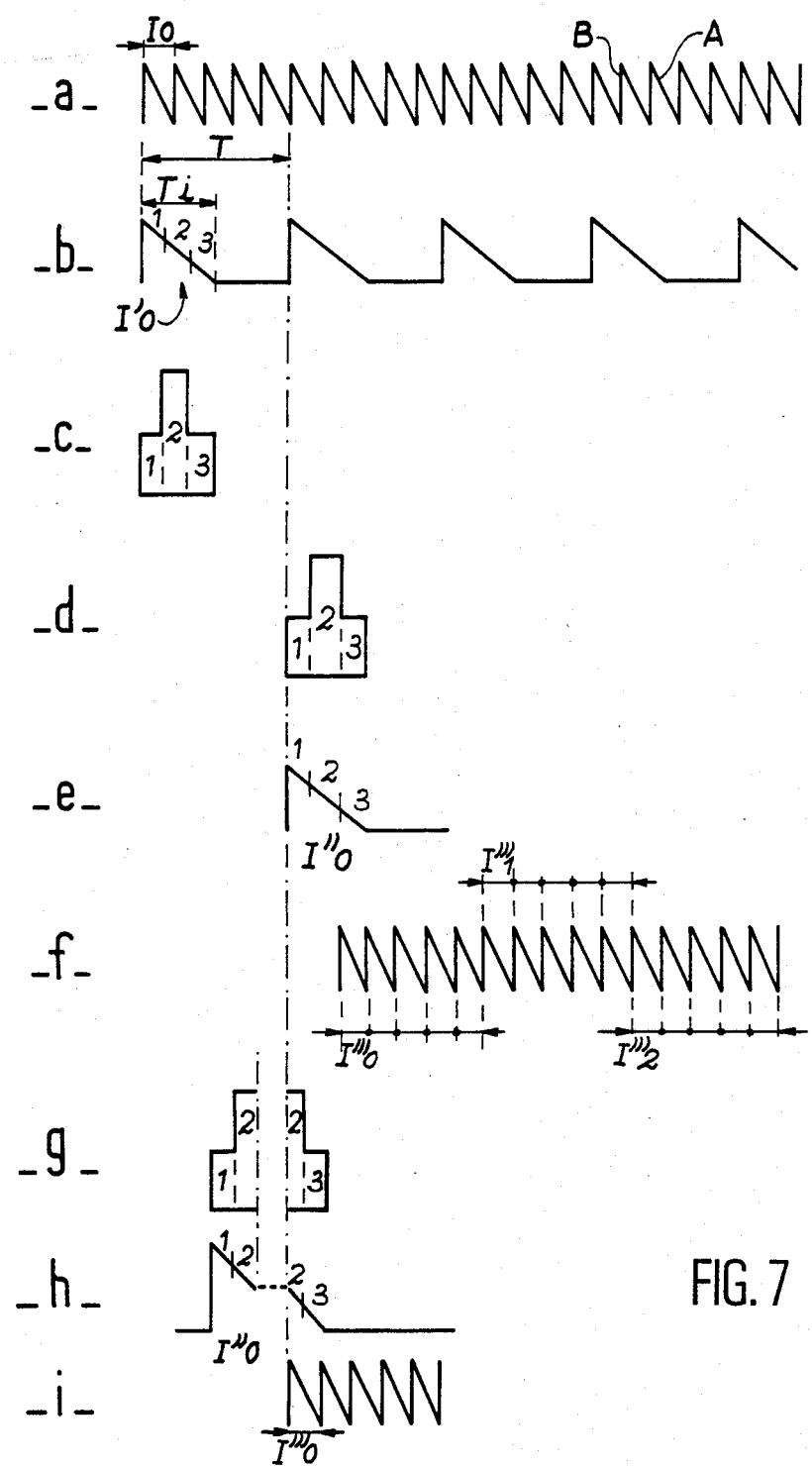
FIG. 7, shows time diagrams which explain the operation of the invention system.

The operation of this system is shown in the time diagrams in FIG. 7. The same types of diagrams are found in this figure as on FIG. 4, that is:

a diagram (a) which shows the image scanning signal and shows the position of the primitive Io image, a diagram (b) which shows the "slowed" I'o image, but which, in this invention, occupies only a portion (Ti/T) of the time period (in the example shown Ti/T=½), a diagram (c) which shows the quantity of bits necessary for the description of the three zones (1,2,3) of the I'o image, a diagram (d) which shows the encoding bits, a diagram (e) which shows the decoded I"o image, a diagram (f) which shows the restoration of the I'''o image to its normal rhythm and its retransmission (in this instance, 5 times), diagrams (g), (h), and (i), which shall be referred to below.

Figure 8:
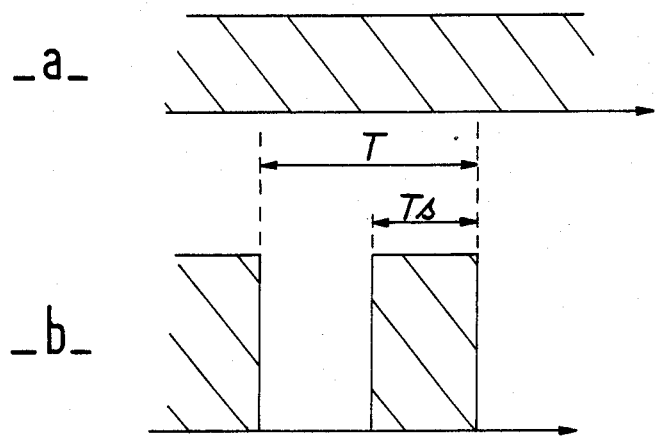
FIG. 8 shows the structure of the sound signal, Finally.

Parallel to this image processing, the invention system accomplishes sound processing, which is shown on FIG. 8. In the (a) section, the digital sound signal of the previous state of the art, with its normal output and its continuousness, can be seen. In the invention, this signal is compressed to a fraction (Ts/T) of the time, with an increased output of Ds.

Figure 9:
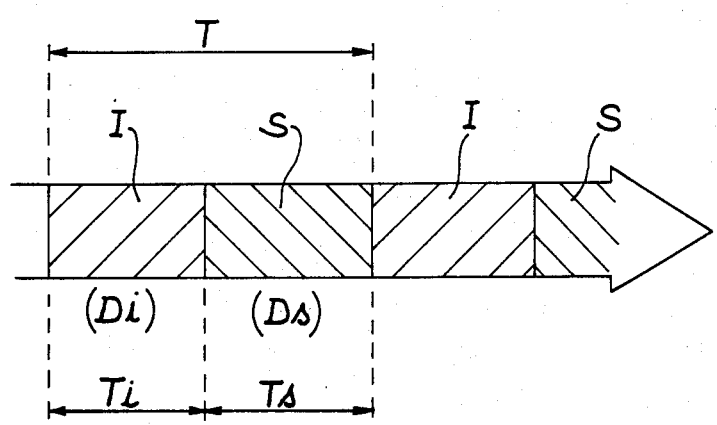
FIG. 9 shows a single channel with alternating picture and sound sequences.

Finally, the picture signal with a length of Ti and an output of Di, and the sound signal, with a length of Ts and an output of Ds, are multiplexed on a single transmission channel, which is shown in FIG. 9. There is also a sequential alternation of picture and sound, in which the sound is automatically delayed in relation to the corresponding image. In the example shown, picture and sound are transmitting alternately during half of the time.

Upon reception, the image is reconstructed as shown in FIG. 7. The sound is made continuous again by, for example, reading from a buffer memory in sound decoder 38, with the reading being T/Ts times slower than the writing.

Figure 4:
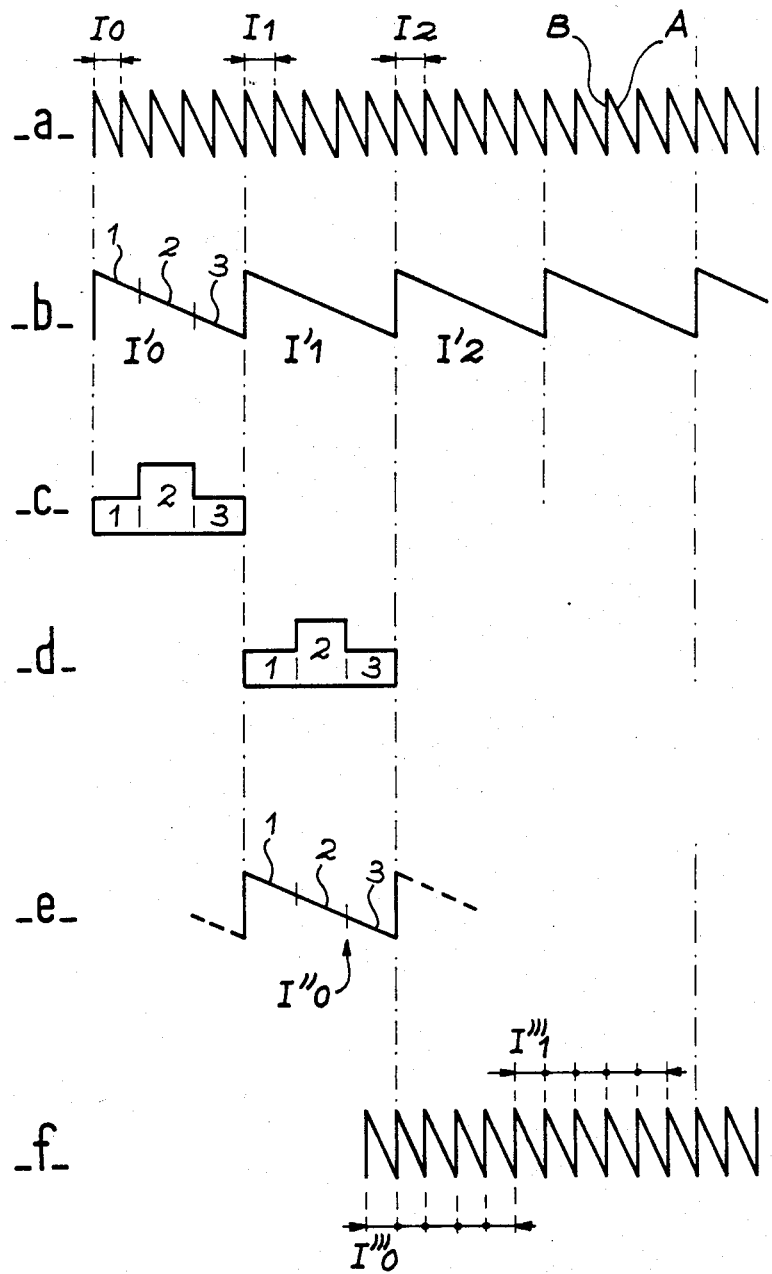

By comparing Diagram (f) on FIG. 7 with diagram (f) on FIG. 4, it can be observed that the delay in the restitution of the I"o image is reduced in the case of the invention, going precisely in the direction of reducing the problem outlined above.

Figure 5:
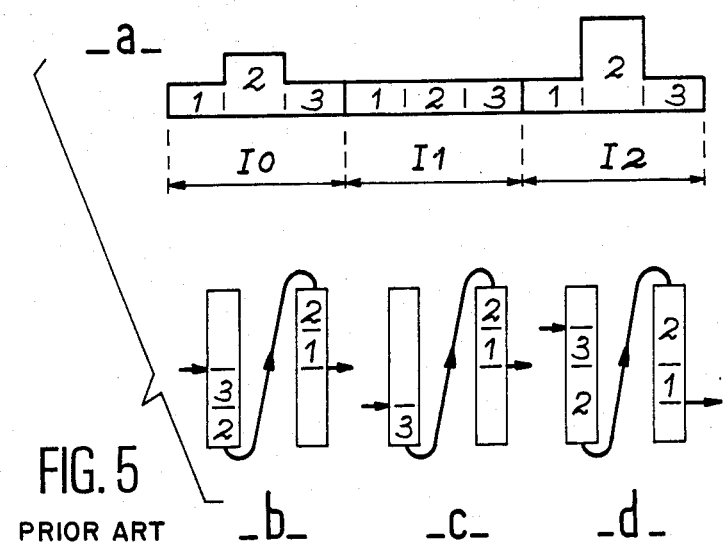

This delay may be further reduced if it is handled as shown in diagrams (g), (h), and (i) of FIG. 7. In effect, when the I'o image has been constructed (diagram c), it is possible to begin reconstructing the first half of the I"o image (diagram g), since, as shown in FIG. 5, the decoder buffer memory, when it processes an image, already contains part of the following image. It is therefore possible to begin decoding the following image and finish it after restarting the transmission of image bits (diagram h). A first image (I'''o) is thereby obtained even earlier, and, in practice, with a slowed image delay (T) for the primitive Io image (diagram i).

The preceding examples pertain to an instance in which the picture output is 64 kbits/s, and the sound output is 64 kbits/s (Ti=Ts=T/2 and Di=Ds). However, the invention can be applied to any other instance, such as for example 96 kbits/s for the picture and 32 kbits/s for the sound. It is equally applicable in a case when there is only a single 64 kbits/s line, with 48 kbits/s for the picture and 16 kbits/s for the sound, for example.

The problem of the delay between sound and picture which is found with low output transmission such as 64 kbits/s is therefore solved by the system which has just been described, and which proposes the multiplexing of picture and sound, (an encoded image, with matching sound), which have outputs which are essentially identical (64 kbits/s/64 kbits/s; 96 kbits/s/32 kbits/s; 48 kbits/s/16 kbits/)

We claim:

1. The image and sound transmission system which includes:

(A) a transmission system comprising:
  (a) an image transmission unit including a device (10) for capturing images, a pre-buffer memory (12), which is written upon with a picture signal at a certain frequency (F), read at a frequency (F/N), (N) being an image speed reduction factor and emits a signal corresponding to one picture among (N) pictures, an image coding device (14) which includes an encoder (16) and a buffer memory (18), and this device (14) emits an encoded digital picture signal, and
  (b) a sound transmission unit including a sound input device (32) and a sound processing unit (34), which emits a digital sound signal;
(B) means (20,36) for the transmission of the digital picture signal and the digital sound signal; and
(C) a receiving unit comprising
  (a) an image decoding device (22), which receives the encoded digital signal transmitted and which includes a decoder (24) and a buffer memory (26), and emits a decoded picture signal at a frequency (F/N), a device (28) for retransmitting the decoded picture signal N times, and a picture display medium (30) which reconstructs the sequences of N identical images, and
  (b) sound processing means which include a sound decoder (38) and a sound restitution device (40), and wherein:
(A) in the transmission system:
  (a) the pre-buffer memory (12), the encoder (16) and the buffer memory (18) of the image transmission unit operate only during a fraction (Ti/T) of the (total operating) time and T/Ti times faster than if they operated continuously, T being the length of an encoded image, with this unit emitting a digital signal with an output of Di kbits/s and with a length of Ti,
  (b) the sound processing unit (34) emits a digital sound signal during only a fraction (Ts/T) of the (total operating) time, with an output of LDs kbits/s, and
  (c) there is, in addition, a multiplexer (50) with two inputs, one input (51) being connected to the output of the coding device (14), and the other input (52) being connected to the output of the sound processing unit (34), this multiplexer (50) having an output (53) which emits a signal made up of sequences with the time interval (T), each sequence having first a picture signal with a length of Ti, then a sound signal with a length of Ts, with T=Ti+Ts;

(B) the transmission means are made up of a single transmission line (54) connected to the multiplexer output, this single line having an output (D) equal to the sum of the outputs; and (C) in its receiving unit:
  (a) there is a demultiplexer (56) with an input (57) connected to the single transmission line (54) and to two outputs (58,59), the first of which emits a digital picture image with a length of Ti and an output of Di, and the second of which emits a digital sound signal with a length of Ts and an output of Ds,
  (b) the image decoding device (22) is connected to the first demultiplexer output (58) and to its decoder (24), which only operates during a fraction (Ti/T) of the (total operating) time, with the Ti being the length of the picture signal, and
  (c) the sound processing means are connected to the second demultiplexer output (59) and only operate during a fraction (Ts/T) of the (total operating) time, with Ts being the length of the sound signal.

2. A system in accordance with claim 1, in which the two outputs, Di and Ds, are equal, and the single transmission line (54) has an output equal to twice those outputs.

3. A system in accordance with claim 1, in which Di=Ds=64 kbits/s, with the single transmission (54) having an output equal to 128 kbits/s.

4. A system in accordance with claim 1, in which the Di output is greater than the Ds output.

5. A system in accordance with claim 1, in which Di=τkbits/s and Ds=32 kbits/s, with the single transmission line (54) having an output of 128 kbits/s.

6. A system in accordance with claim 1, in which Di=48 kbits/s and DS=16 kbits/s, with the single transmission line (54) having an output of 64 kbits/s.

* * * * *